(12) United States Patent
Merlock et al.

(10) Patent No.: US 11,678,257 B2
(45) Date of Patent: Jun. 13, 2023

(54) SYSTEMS, METHODS, AND DEVICES FOR SUPPLEMENTAL SCANNING IN WIRELESS NETWORKS

(71) Applicant: Cypress Semiconductor Corporation, San Jose, CA (US)

(72) Inventors: Alan Merlock, Crystal Lake, IL (US); Greg Gangitano, San Jose, CA (US); Kenneth Lap-Yu Ma, Los Altos, CA (US); Bradley Evans, Northville, MI (US)

(73) Assignee: Cypress Semiconductor Corporation, San Jose, CA (US)

( * ) Notice: Subject to any disclaimer, the term of this patent is extended or adjusted under 35 U.S.C. 154(b) by 104 days.

(21) Appl. No.: 17/463,706

(22) Filed: Sep. 1, 2021

(65) Prior Publication Data
US 2023/0061086 A1    Mar. 2, 2023

(51) Int. Cl.
*H04W 48/10* (2009.01)
*H04W 72/51* (2023.01)
*H04W 72/0446* (2023.01)

(52) U.S. Cl.
CPC ....... *H04W 48/10* (2013.01); *H04W 72/0446* (2013.01); *H04W 72/51* (2023.01)

(58) Field of Classification Search
None
See application file for complete search history.

(56) References Cited

U.S. PATENT DOCUMENTS 9,467,845 B1 * 10/2016 Rastogi .................. H04W 8/14
2016/0174272 A1 * 6/2016 Rabii ..................... H04W 8/005
455/422.1

* cited by examiner

*Primary Examiner* — Hong S Cho

(57) ABSTRACT

Systems, methods, and devices implement supplemental scanning for establishing network connections in wireless networks. Methods include sending a request to a wireless device, the request including a plurality of scanning parameters, the plurality of scanning parameters identifying a plurality of requested wireless network parameters. Methods also include receiving a reply from the wireless device, the reply including a result of one or more scanning operations performed based on the plurality of scanning parameters. Methods further include selecting, using one or more processors, one or more network connection operations based, at least in part, on the result of the one or more scanning operations, the one or more network connection operations identifying a timing relative to a plurality of wireless projection packets. Methods additionally include performing, using the one or more processors, the one or more network connection operations based, at least in part, on the identified timing.

20 Claims, 9 Drawing Sheets

SYSTEMS, METHODS, AND DEVICES FOR SUPPLEMENTAL SCANNING IN WIRELESS NETWORKS

TECHNICAL FIELD

This disclosure generally relates to wireless communications devices, and more specifically, to scanning modalities associated with network connectivity for wireless communications devices.

BACKGROUND

Wireless devices may communicate with each other via one or more communications modalities, such as a Wi-Fi connection and/or a Bluetooth connection. Accordingly, such wireless communication may be implemented in a manner compliant with a wireless communication protocol. Moreover, such wireless devices may be implemented in the context of one or more communications networks, and may perform network discovery and connection operations to connect to such networks. Conventional techniques for performing network discovery and connection operations remain limited because they may be resource intensive and are limited in their ability to be performed concurrently with other functionalities provided by the wireless devices.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may communicate with each other via one or more communications modalities, such as a Wi-Fi connection and/or a Bluetooth connection. Moreover, multiple wireless devices may be implemented in a single communication network. For example, multiple wireless devices may be implemented in particular context, such as a vehicle. Moreover, wireless devices may be configured as stations, and a particular wireless device may be configured as an access point. In such an example, the access point may perform network discovery operations to identify external networks that may be connected to. In some embodiments, the wireless device configured as the access point may also support other connectivity features, such as high quality-of-service (QoS) connections with one or more wireless devices configured as a station. Such high-QoS connections may have stringent latency and connectivity requirements. Accordingly, the transmission and reception of packets for such a high-QoS connection may interfere with and reduce the efficacy of interleaved network discovery operations.

Various embodiments disclosed herein provide the ability to concurrently support high-QoS wireless connections while also concurrently performing network discovery operations, and in a manner that reduces resource conflicts between the two. More specifically, embodiments disclosed herein provide the ability to identify idle radios in communication with an access point, and use those idle radios to implement network discovery operations. As will be discussed in greater detail below, results of the distributed and delegated scanning operations may be used to identify a network device to be connected to, as well as enable the access point to connect to the identified network device in a targeted and non-persistent manner. In this way, scanning operations are performed by the access point more efficiently, and contention with other transmission/reception operations associated with a high-QoS connection is reduced, thus ensuring that the high-QoS may be maintained.

Figure 1:
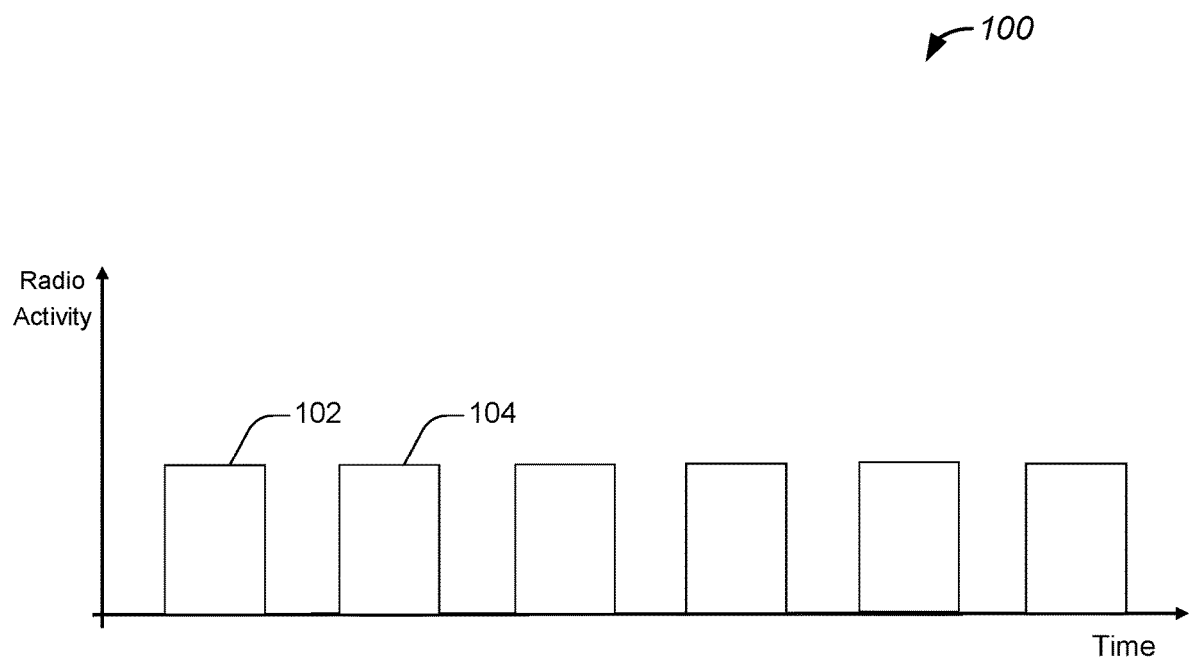
FIG. 1 illustrates an example of a timing diagram for network traffic, implemented in accordance with some embodiments.

FIG. 1 illustrates an example of a timing diagram for network traffic, implemented in accordance with some embodiments. As shown in FIG. 1, timing diagram 100 illustrates the transmission of wireless projection packets over time. As will be discussed in greater detail below, wireless projection packets are data packets that may be used to stream data over a high-QoS connection. For example, applications that use streaming of audio files, such as Apple CarPlay® and Android Auto®. Such connections often have low latency requirements to avoid interruption in music playback. Accordingly, data streamed over such a connection may be sent periodically during designated times for the wireless projection data packets, such as wireless projection packet 102 and wireless projection packet 104.

Figure 2:
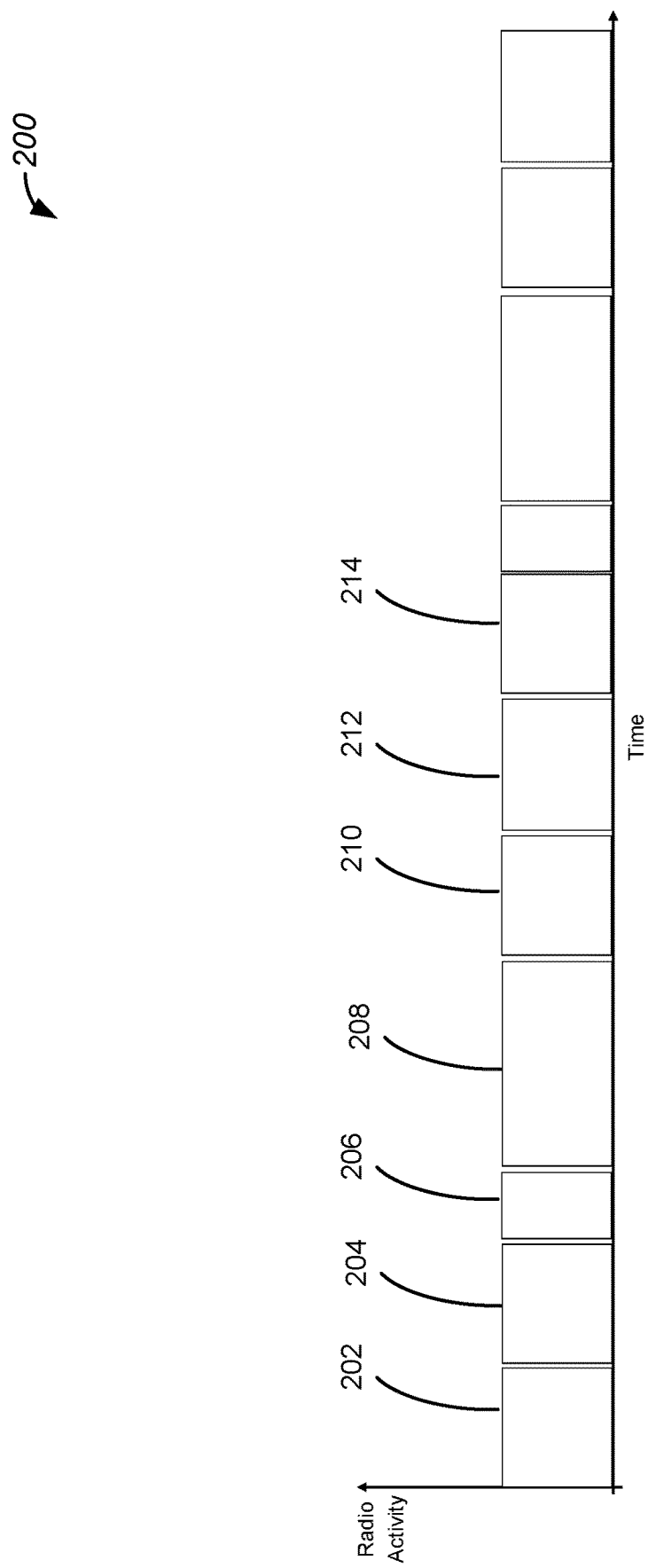
FIG. 2 illustrates an example of a timing diagram for persistent scanning for a network connection, implemented in accordance with some embodiments.

FIG. 2 illustrates an example of a timing diagram for persistent scanning for a network connection, implemented in accordance with some embodiments. As discussed above and as will be discussed in greater detail below, wireless devices may be configured to facilitate network connections on one or more frequency bands. For example, a wireless device may concurrently support 2.4 GHz and 5.0 GHz frequency bands. In one example, a wireless device may be an access point that is configured to handle concurrency of 2.4 GHz access point, 5.0 GHz access point, and 5.0 GHz station functionality. When supporting a high-QoS connection, the radio of the wireless device may be tied to a particular channel on which the QoS connection is implemented. As will be discussed in greater detail below, scanning operations may be used to search for other networks and network devices with which to connect. More specifically, while a wireless device is supporting a high-QoS wireless connection for streamed audio, it may also want to scan for other networks, such as hotel network or a store network. Such scanning operations for other networks must be interlaced between wireless projection packets.

For example, wireless projection packets may be sent at particular times, as shown by wireless projection packet 202 and wireless projection packet 212. Scanning operations may be performed between such wireless projection packets. More specifically, radio channel change 204 may be performed to switch to another channel, probe transmit operation 206 may be performed to search for other network devices, probe response operation 208 may be performed to wait for and receive a reply from the network device, and radio channel change 210 may be performed to switch back to the original channel Once wireless projection packet 212 has been received, another iteration of scanning operations may be performed, for example, starting with radio channel change 214. As shown in FIG. 2, the scanning operations are persistent, and are repeated between each set of wireless projection packets.

Figure 3:
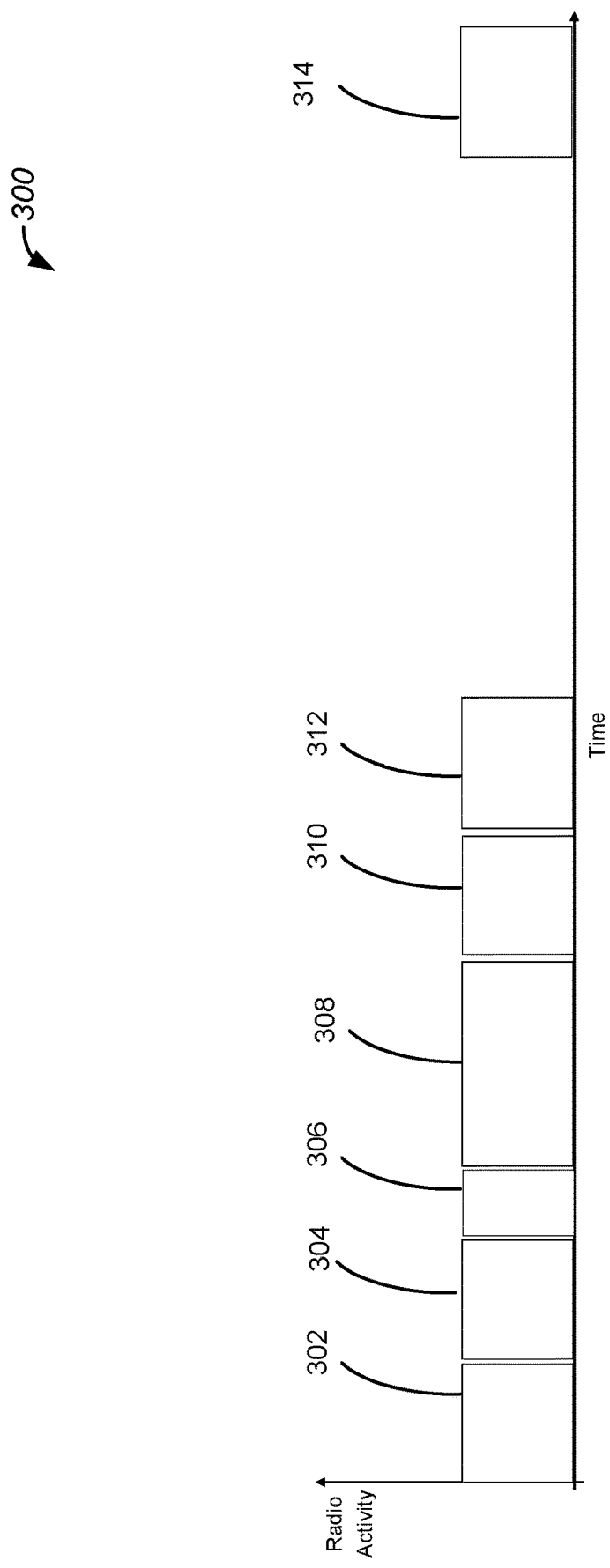
FIG. 3 illustrates an example of a timing diagram for non-persistent scanning for a network connection, implemented in accordance with some embodiments.

FIG. 3 illustrates an example of a timing diagram for non-persistent scanning for a network connection, implemented in accordance with some embodiments. As similarly discussed above, wireless projection packets, such as wireless projection packet 302, wireless projection packet 312, and wireless projection packet 314 may be sent as part of a high-QoS network connection. Moreover, scanning operations, such as radio channel change 304, probe transmit operation 306, probe response operation 308 and radio channel change 310 may be performed between wireless projection packets such as wireless projection packet 302 and wireless projection packet 312. As shown in FIG. 3, the scanning operations are not persistent, and are performed once. Moreover, scanning operations may be implemented in response to a positive identification of another network device of interest, and such scanning operations might otherwise not be implemented. Accordingly, scanning operations might not be implemented in the absence of such a positive identification, and operations 304, 306, 308, and 310 might be implemented in response to receiving a positive identification.

As will be discussed in greater detail below, other wireless devices that may be connected to the network may be used to perform scanning and discovery operations that identify a network or network device of interest. That identified network device may then be targeted during operations 304, 306, 308, and 310, and a network connection may be established with the identified device. In this way, the scanning operations implemented by the access point supporting the high-QoS connection are reduced, and the ability to concurrently support a high-QoS connection and scan for other networks is improved.

Figure 4:
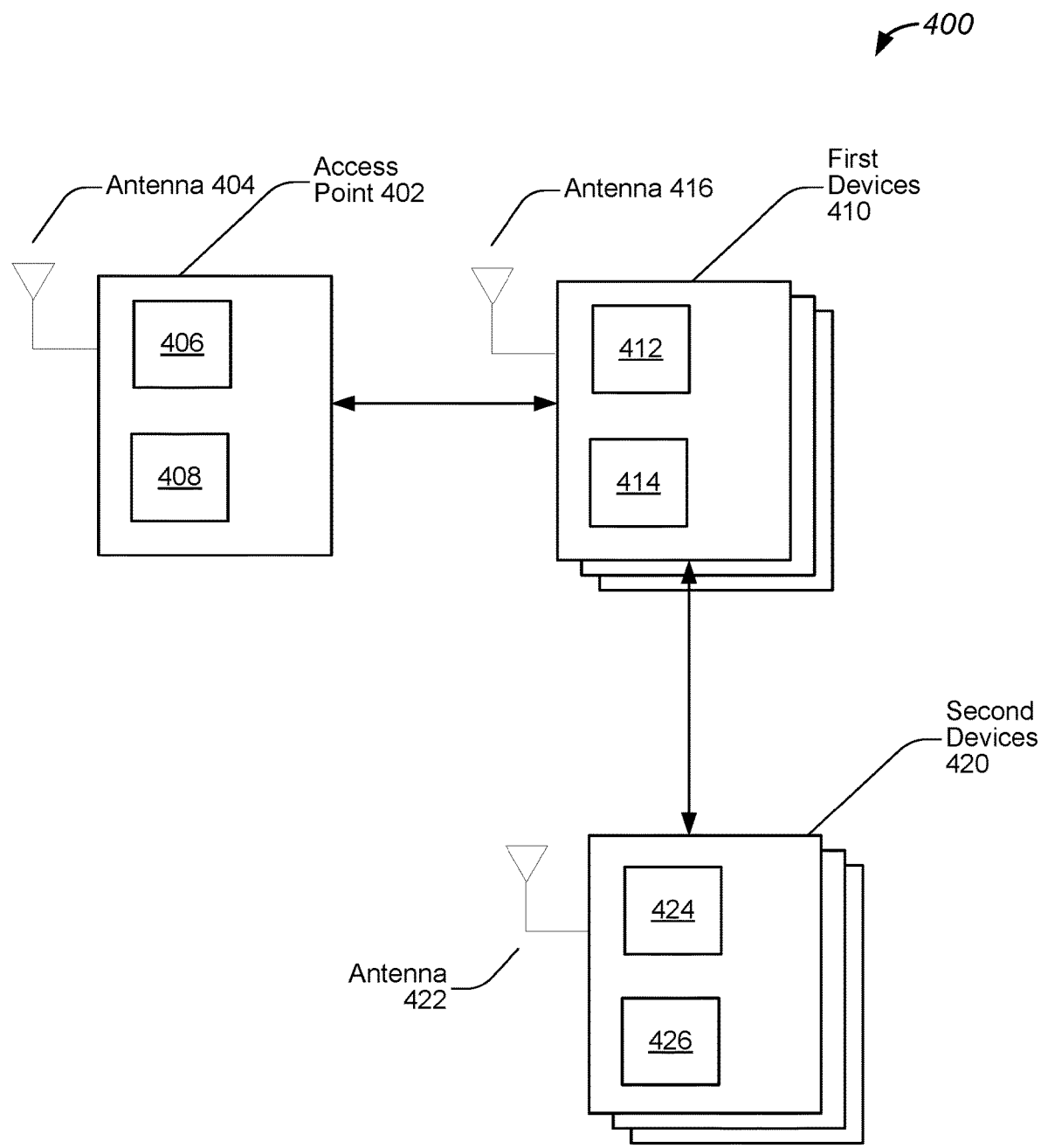
FIG. 4 illustrates an example of a system for supplemental scanning in a wireless network, configured in accordance with some embodiments.

FIG. 4 illustrates an example of a system for supplemental scanning in a wireless network, configured in accordance with some embodiments. As shown in FIG. 4, various wireless devices may communicate with each other via one or more wireless communications media. For example, wireless devices may communicate with each other via a Wi-Fi connection and/or a Bluetooth connection. In various embodiments, the wireless devices may first establish connections or communications links before data transfer occurs. Once a communications link is established, packetized network traffic may be sent over a communications network. Accordingly, data packets may be sent and received between such wireless devices. As will be discussed in greater detail below, wireless devices disclosed herein and systems, such as system 400, that include such wireless devices are configured to utilize idle radios and transceivers of wireless devices in the network to perform supplemental scanning operations used for network discovery. In this way, idle radios in the network may be used to implement network discovery operations, and the result of such network discover operations may be used by an access point to connect to an additional network device.

System 400 includes access point 402 which may be a wireless device configured to support wireless connections on multiple frequency bands and corresponding channels. For example, access point 402 may be configured to support concurrent wireless connections at 2.4 GHz and 5 GHz. Accordingly, access point 402 may include one or more transceivers, such as transceiver 406 and an associated processing device, such as processing device 408. Access point 402 may also include one or more antennas, such as antenna 404. In various embodiments, Access point 402 is compatible with one or more wireless transmission protocols, such as a Wi-Fi protocol and a Bluetooth protocol. As will be discussed in greater detail below, access point 402 may be implemented in the context of a system of devices, such as an infotainment system of a car. Accordingly, access point 402 may support multiple wireless connections with other wireless devices, and may support high-QoS features such as Apple CarPlay® and Android Auto®.

As will also be discussed in greater detail below, access point 402 may use other wireless devices to implement scanning operations for discovery of other network devices. Accordingly, access point 402 may identify other wireless devices and delegate scanning and discovery operations to such other wireless devices to reduce overhead incurred by such scanning and discovery operations at access point 402, and ensure that high-QoS wireless connections are not interrupted.

In various embodiments, system 400 additionally includes first devices 410 which may be wireless devices. As discussed above, such wireless devices may be compatible with one or more wireless transmission protocols, such as a Wi-Fi protocol and a Bluetooth protocol. In some embodiments, first devices 410 are mobile communications devices, such as smartphones. In various embodiments, first devices 410 are low energy Bluetooth devices that are compatible with a Bluetooth Low Energy specification and protocol, also referred to as Bluetooth Smart. The Bluetooth Low Energy protocol may have multiple operational modes, such as LE 1M, 2M, and LE Long Range (LELR). Moreover, such wireless devices may be smart devices, such as those found in wearable devices. It will be appreciated that, first devices 410 may be any suitable device, such as those found in cars, other vehicles, and even medical implants.

As shown in FIG. 4, various wireless devices may be in communication with each other via one or more wireless communications mediums. As shown in FIG. 4, first devices 410 may each include an antenna, such as antenna 416. First devices 410 may also include processing device 414 as well as transceiver 412. As will be discussed in greater detail below, such processing devices, transceivers, and radios may be configured to send and receive data packets between each other, and perform scanning operations for network discovery. More specifically, as will be discussed in greater detail below, first devices 410 may be configured to receive scanning parameters from access point 402 and implement scanning operations based on the received scanning parameters.

In some embodiments, system 400 may further include second devices 420 which may also be wireless devices. As similarly discussed above, second devices 420 may be compatible with one or more wireless transmission protocols, such as a Wi-Fi protocol and a Bluetooth protocol. Moreover, second devices 420 may be wireless devices such as wireless headsets. Accordingly, in some embodiments, second devices 420 are Bluetooth headsets. In some embodiments, second devices 420 may also be smart devices or other devices, such as IoT devices, devices found in cars, other vehicles, and medical implants. In various embodiments, second devices 420 may be different types of devices than first devices 410. As discussed above, each of second devices 420 may include an antenna, such as antenna 422, as well as processing device 426 and transceiver 424, which may also be configured to establish communications connections with other devices, and transmit and receive data in the form of data packets via such communications connections. Accordingly, as discussed above, second devices 420 may also be configured to receive scanning parameters from access point 402 and implement scanning operations based on the received scanning parameters.

Figure 5:
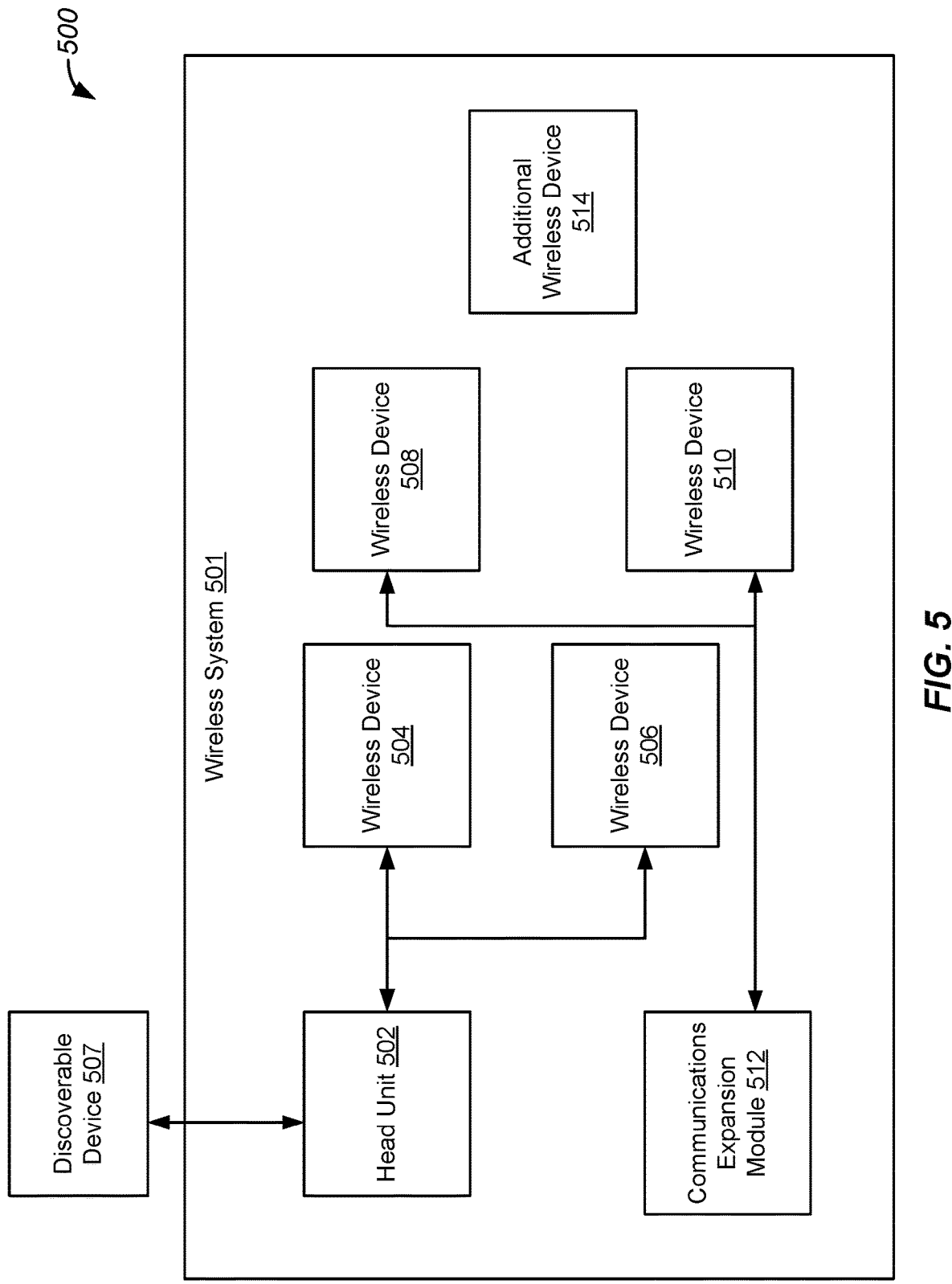
FIG. 5 illustrates another example of a system for supplemental scanning in a wireless network, configured in accordance with some embodiments.

FIG. 5 illustrates another example of a system for supplemental scanning in a wireless network, configured in accordance with some embodiments. As shown in FIG. 5, various wireless devices may communicate with each other via one or more wireless communications media. As will be discussed in greater detail below, wireless devices disclosed herein and systems that include such wireless devices are configured to utilize idle radios and transceivers of wireless devices in the network to perform supplemental scanning operations used for network discovery. Moreover, a system, such as system 500, may be configured to include multiple different types of wireless devices that may be managed by a particular wireless device to perform such supplemental scanning operations.

In various embodiments, system 500 includes wireless system 501 which is configured to perform supplemental scanning operations for network discovery. As will be discussed in greater detail below, wireless system 501 includes multiple wireless devices that may communicate with each other via one or more network connections over one or more frequency bands, and in a manner compatible with one or more communications protocols, such as Bluetooth and Wi-Fi. As will also be discussed in greater detail below, the wireless devices in wireless system 501 may be configured to distribute network discovery operations among available wireless devices thus reducing contention among usage of Bluetooth and Wi-Fi connections of a particular wireless device, such as an access point.

In various embodiments, wireless system 501 includes head unit 502 which may be configured as an access point in wireless system 501. Accordingly, head unit 5002 may be a wireless device that is configured to support access point functionality on one or more frequency bands, such as 2.4 GHz and 5 GHz, and in a manner compatible with one or more communications protocols, such as a Bluetooth and a Wi-Fi protocol. Moreover, head unit 502 may be configured to support station functionality when appropriate, such as when connected to a network device of an external network. As will be discussed in greater detail below, head unit 502 may be configured to communicate with other wireless devices in wireless system 501, and to manage such other wireless devices to perform network discovery operations for head unit 502.

In various embodiments, head unit 502 is implemented as a head unit in the context of a vehicle, such as an automobile. Accordingly, head unit 502 may be included in an infotainment system of wireless system 501, that is implemented in the automobile. Accordingly, as will be discussed in greater detail below, multiple wireless devices may be implemented within the automobile, and network discovery operations may be performed as the automobile travels in and out of range of various external networks as may be available at, for example, a hotel or a coffee shop.

Wireless system 501 additionally includes multiple wireless devices, such as wireless device 504 and wireless device 506. In various embodiments, wireless device 504 and wireless device 506 may both be mobile communications devices such as smartphones. Accordingly, each of wireless device 504 and wireless device 506 may be configured to support a network connection over one or more frequency bands, such as 2.4 GHz and 5 GHz, and in a manner compatible with one or more communications protocols, such as a Bluetooth and a Wi-Fi protocol. In various embodiments, wireless devices such as wireless device 504 and wireless device 506 may be configured to establish one or more network connections with head unit 502 over the one or more frequency bands.

Moreover, wireless device 504 and wireless device 506 may each establish a high-QoS connection with head unit 502 that may simultaneously use multiple network connections. For example, a high-QoS connection, such as Apple CarPlay® and Android Auto®, may be established between wireless device 504 and head unit 502 in which wireless device 504 streams audio data to head unit 502, and such a high-QoS connection may utilize both a Wi-Fi connection and a Bluetooth connection.

Wireless system 501 further includes additional wireless devices, such as wireless device 508 and wireless device 510. In various embodiments, wireless device 508 and wireless device 510 are wireless devices that are different than wireless device 504 and wireless device 506. For example, wireless device 508 and wireless device 510 may be Bluetooth headsets that are configured to be worn by users and provide connectivity to content played by the infotainment system. In some embodiments, such wireless devices may have a single transceiver and may also be configured to perform network discovery operations in accordance with parameters set forth by head unit 502.

In various embodiments, wireless system 501 additionally includes communications expansion module 512 which may be configured to support both Bluetooth and Wi-Fi connections with additional wireless devices. Thus, according to some embodiments, communications expansion module 512 is configured to communicate with wireless device 508 and wireless device 510 and operate as an intermediary between wireless device 508 and wireless device 510 and head unit 502. In some embodiments, communications expansion module 512 is included within head unit 502, and is implemented as an expansion module integrated with head unit 502. It will be appreciated that communications expansion module 512 may be implemented optionally. Accordingly, in some embodiments, wireless system 501 does not include communications expansion module 512, and wireless device 508 and wireless device 510 communicate directly with head unit 502.

Wireless system 501 further includes additional wireless device 514 which may be an additional device that is implemented within wireless system 501. In some embodiments, additional wireless device 514 is a wireless device that may be some other component of the environment in which wireless system 501 is implemented. For example, additional wireless device 514 may be an electric vehicle (EV) charger, a sensor, a component of a door lock, or some other wireless-capable device. In this way, various other devices that are configured to support network connections may be identified within wireless system 501 and utilized for the scanning and network discovery operations disclosed herein.

In various embodiments, system 500 also includes discoverable device 507 which may be a network device of an external network. Accordingly, discoverable device 507 may be an access point of an external network that wireless system 501 seeks to discover. As will be discussed in greater detail below, scanning operations as well as network connection operations performed by components of wireless system 501, such as head unit 502 and other wireless devices, may be used to discover discoverable device 507 and establish a network connection with discoverable device 507.

Figure 6:
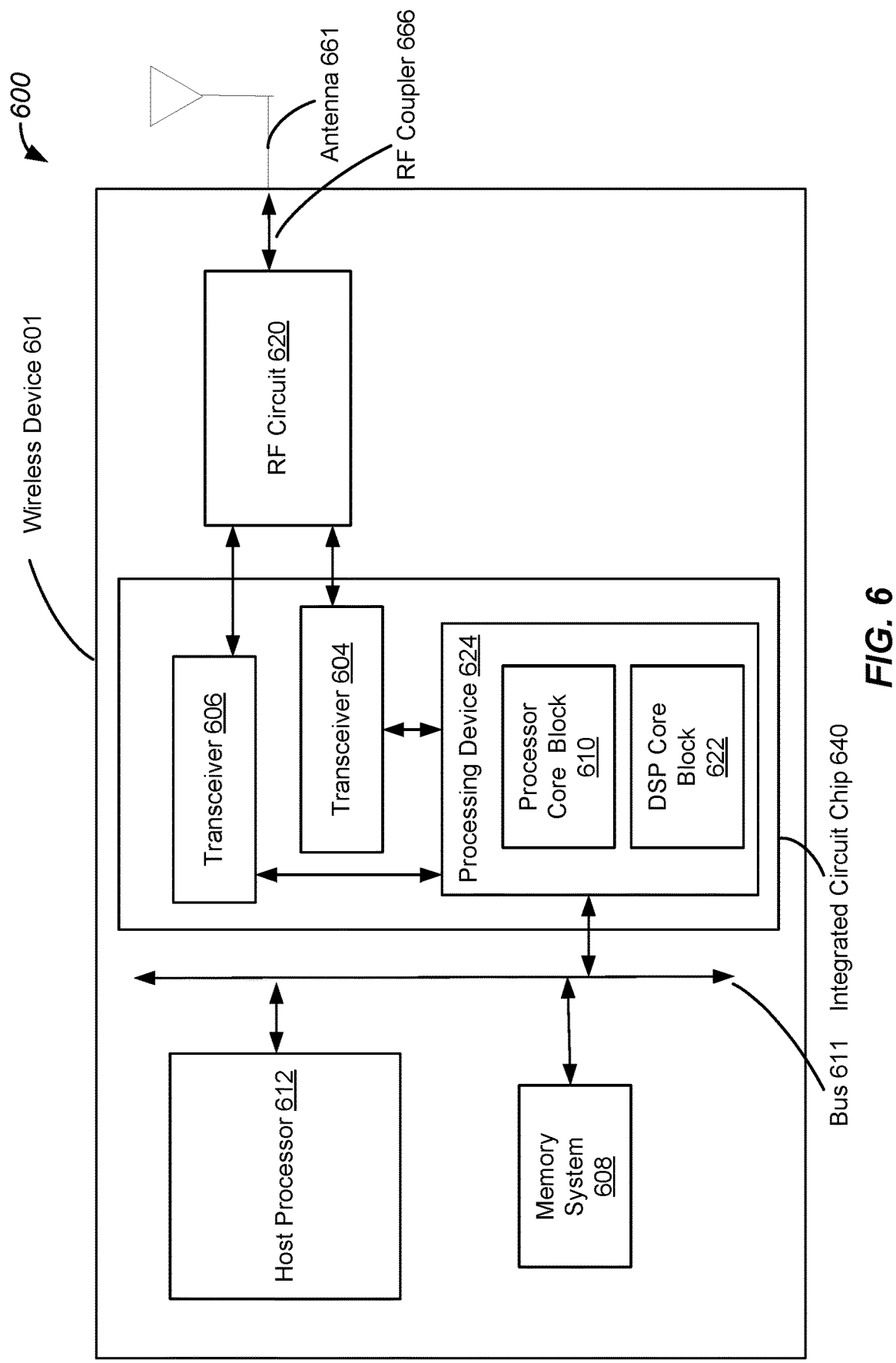
FIG. 6 illustrates an example of a device for supplemental scanning in a wireless network, configured in accordance with some embodiments.

FIG. 6 illustrates an example of a device for supplemental scanning in a wireless network, configured in accordance with some embodiments. More specifically, FIG. 6 illustrates an example of a system, such as system 600, that may include wireless device 601. It will be appreciated that wireless device 601 may be one of any of wireless devices discussed above with reference to FIGS. 4 and 5. In various embodiments, wireless device 601 includes transceivers, such as transceiver 604 and transceiver 606, which are configured to transmit and receive signals using a communications medium that may include antenna 661. Accordingly, each of transceiver 604 and transceiver 606 may include a transmitter having one or more components forming a transmit path, and may also include a receiver having one or more components forming a receive path. As noted above, transceiver 604 may be included in a Bluetooth radio, and may be compatible with a Bluetooth Low Energy communications protocol. Accordingly, packets disclosed herein may be Bluetooth packets. In some embodiments, the packets may be Bluetooth Low Energy packets. Moreover, transceiver 606 may be compatible with a Wi-Fi communications protocol, and may be configured to transmit and receive Wi-Fi data packets. In various embodiments, transceiver 604 and transceiver 606 may each include components, such as one or more buffers and filters, that are configured to generate signals and receive signals via antenna 661.

In various embodiments, system 600 includes processing device 624 which may include one or more processor cores as well as processing logic configured to implement scanning operations and network connection operations disclosed herein. In various embodiments, processing device is configured to manage scanning operations, network discovery operations, and connection operations disclosed herein. Accordingly, processing device 624 may be configured to manage communications with other wireless devices tasked with scanning operations, as well as manage connection establishment with a discovered network device when appropriate. Additional details regarding such scanning and discovery operation are discussed in greater detail below with reference to FIGS. 7-9.

In various embodiments, processing device 624 includes one or more components configured to implement a medium access control (MAC) layer that is configured to control hardware associated with a wireless transmission medium, such as that associated with a Bluetooth transmission medium and a Wi-Fi transmission medium. Processing device 624 may also include one or more components, such as processing logic, configured to implement a physical layer (PHY layer) of the Bluetooth protocol and the Wi-Fi protocol. In one example, processing device 624 may include processor core block 610 that may be configured to implement a driver, such as a Bluetooth driver or a Wi-Fi driver. Processing device 624 may further include digital signal processor (DSP) core block 622 which may be configured to include microcode.

In various embodiments, processor core block 610 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In another example, a Wi-Fi stack may be implemented. In various embodiments, a host stack and a controller stack are implemented using at least processor core block 610. For example, the host stack is configured to include layers for a Bluetooth network encapsulation protocol, radio frequency communication, service discovery protocol, as well as various other high-level data layers. The controller stack is configured to include a link management protocol, a host controller interface, a link layer which may be a low energy link layer, as well as various other timing critical layers.

System 600 further includes radio frequency (RF) circuit 620 which is coupled to antenna 661. In various embodiments, RF circuit 620 may include various components such as an RF switch, a diplexer, and a filter. While FIG. 6 illustrates system 600 as having a single antenna, it will be appreciated that system 600 may have multiple antennas. Accordingly, RF circuit 620 may be configured to select an antenna for transmission/reception, and may be configured to provide coupling between the selected antenna, such as antenna 661, and other components of system 600 via a bus, such as bus 611.

System 600 includes memory system 608 which may include one or more memory devices configured to store one or more data values associated with scanning and discovery operations discussed above and in greater detail below. Accordingly, memory system 608 includes storage device, which may be a non-volatile random-access memory (NVRAM) configured to store such data values, and may also include a cache that is configured to provide a local cache. In various embodiments, system 600 further includes host processor 612 which is configured to implement processing operations implemented by system 600.

It will be appreciated that one or more of the above-described components may be implemented on a single chip, or on different chips. For example, transceiver 604, transceiver 606, and processing device 624 may be implemented on the same integrated circuit chip, such as integrated circuit chip 640. In another example, transceiver 604, transceiver 606, and processing device 624 may each be implemented on their own chip, and thus may be disposed separately as a multi-chip module or on a common substrate such as a printed circuit board (PCB). It will also be appreciated that components of system 600 may be implemented in the context of a mobile communications device, a low energy device, a smart device, an IoT device, or a component of a vehicle such as an automobile. Accordingly, some components, such as integrated chip 640, may be implemented in a first location, while other components, such as antenna 661, may be implemented in second location, and coupling between the two may be implemented via a coupler such as radio frequency (RF) coupler 666.

Figure 7:
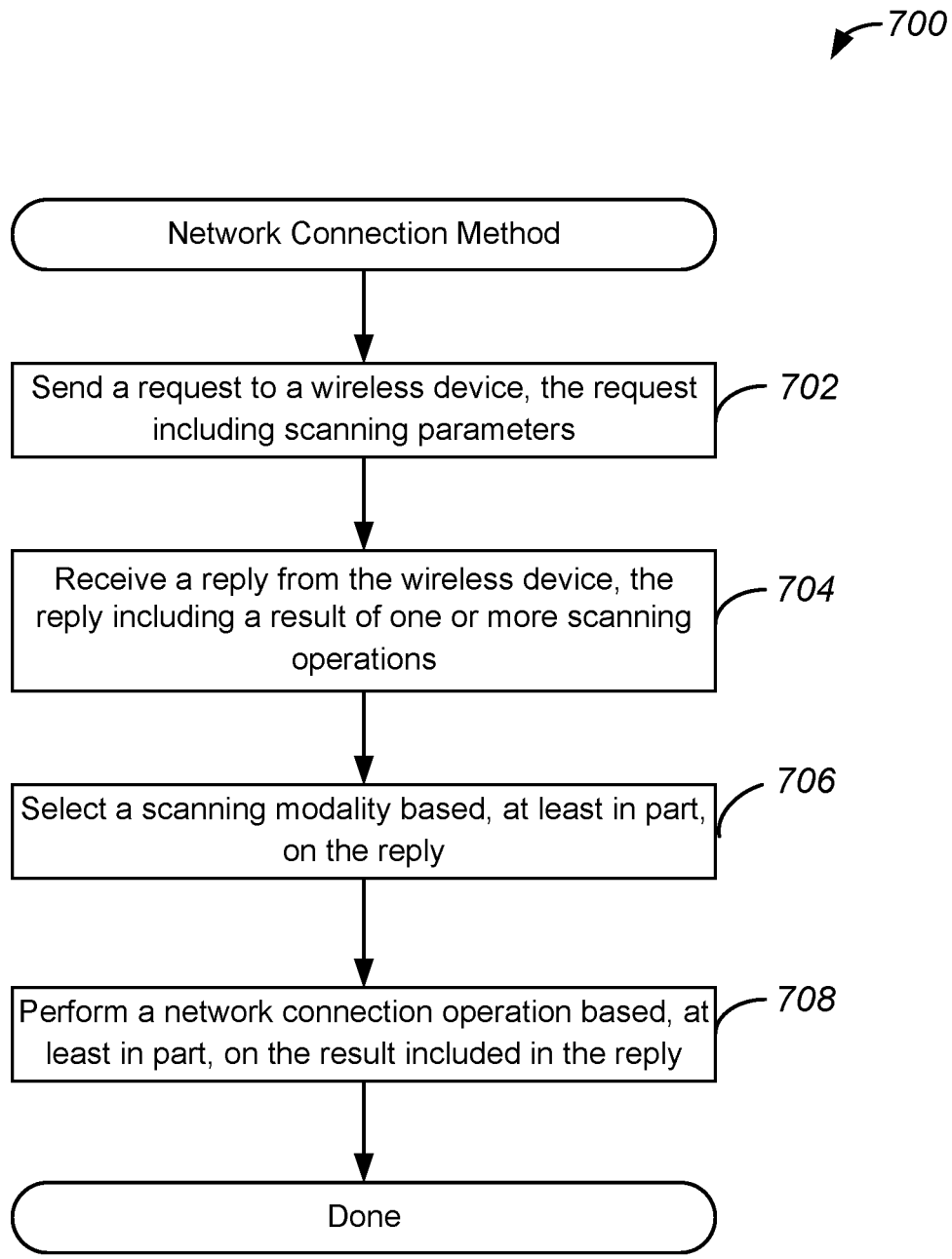
FIG. 7 illustrates an example of a method for supplemental scanning in a wireless network, implemented in accordance with some embodiments.

FIG. 7 illustrates an example of a method for supplemental scanning in a wireless network, implemented in accordance with some embodiments. As will be discussed in greater detail below, wireless devices disclosed herein may utilize idle radios and transceivers of wireless devices in the network to perform supplemental scanning operations used for network discovery. Accordingly, a method, such as method 700, may be performed to utilize multiple different types of wireless devices to perform supplemental scanning operations and facilitate network discovery operations.

Method 700 may perform operation 702 during which a request may be sent to a wireless device. In various embodiments, the request may be sent from an access point in a wireless system. As discussed above, the access point may be included in an infotainment system of an automobile, and the request may be sent to other wireless devices present in the automobile, such as mobile devices and wireless headsets. In various embodiments, the request may include scanning parameters. Accordingly, the scanning parameters may identify features of a network device that the access point intends to scan for. For example, the scanning parameters may identify a particular frequency band on which scanning should be implemented.

Method 700 may perform operation 704 during which a reply may be received from the wireless device. Accordingly, the wireless device may implement the scanning operations as instructed by the access point. Thus, the wireless device may have scanned for discoverable network devices in accordance with the specified scanning parameters. The wireless device may have detected a discoverable network device, and a result of the scanning operations may be included in a reply message that is sent back to the access point. Accordingly, the reply that is received may include the result of one or more scanning operations.

Method 700 may perform operation 706 during which a scanning modality may be selected based, at least in part, on the reply. Accordingly, the access point may identify and select a scanning modality and one or more network connection operations based on the results included in the reply. For example, if the reply includes an identified discoverable network device, the access point may have previously disabled persistent scanning operations, and may instead proceed to configure and select network connection operations based on the information included in the reply, and as similarly discussed above with reference to FIG. 3.

Method 700 may perform operation 708 during which a network connection operation may be performed based, at least in part, on the result included in the reply. Accordingly, during operation 708, the network connection operations may be performed, and a network connection may be established between the access point and the discoverable network device. In this way, additional wireless devices in the system may be utilized for scanning operations and offloaded from the access point, and the access point may instead be used for network connection operations once a discoverable network device is identified.

Figure 8:
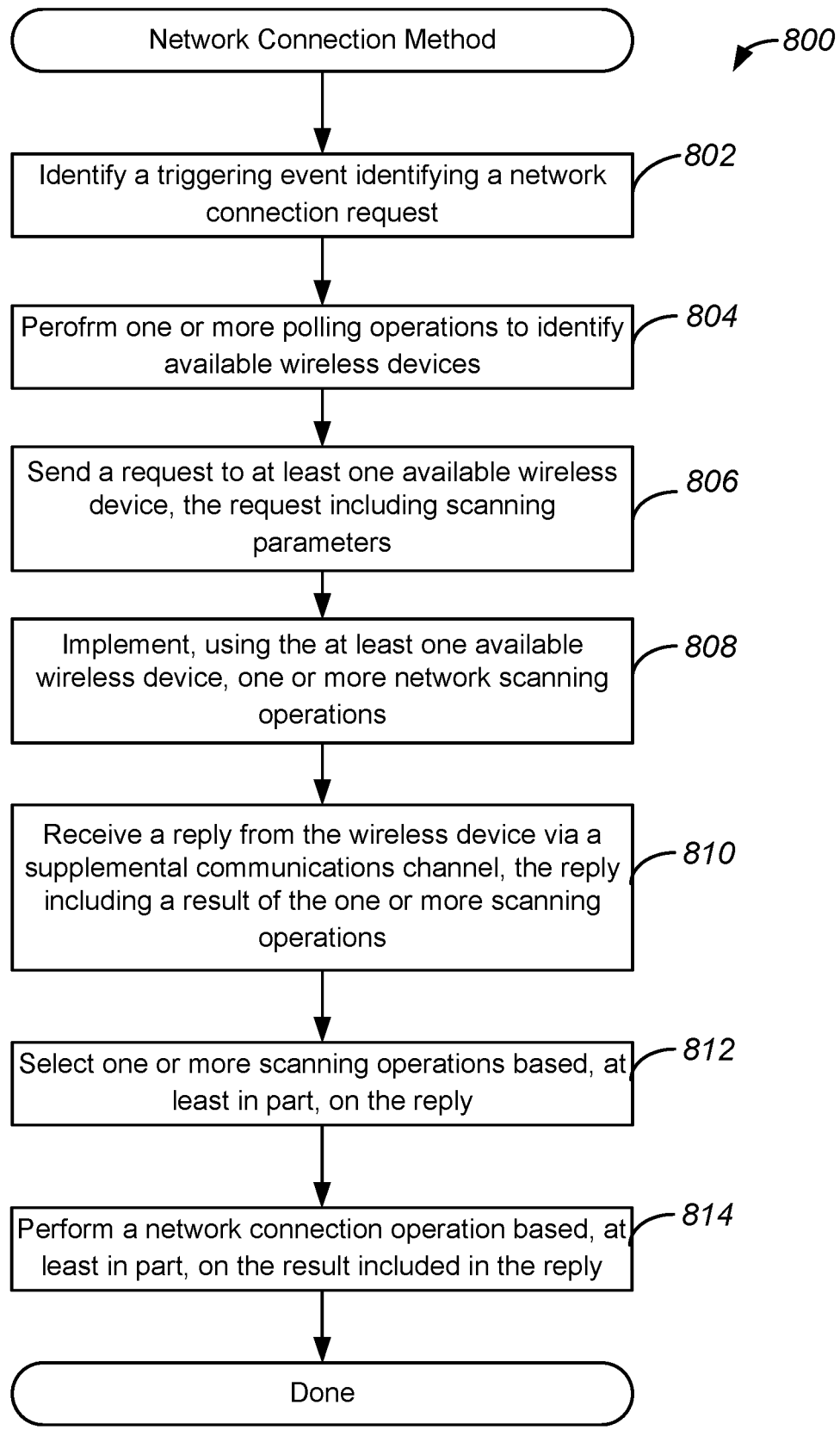
FIG. 8 illustrates an example of another method for supplemental scanning in a wireless network, implemented in accordance with some embodiments.

FIG. 8 illustrates an example of another method for supplemental scanning in a wireless network, implemented in accordance with some embodiments. As similarly discussed above, wireless devices disclosed herein may utilize idle radios and transceivers of wireless devices in the network to perform supplemental scanning operations used for network discovery. As will be discussed in greater detail below, a method, such as method 800, may be performed to discover and identify available wireless devices in a wireless system, and configure the available wireless devices to perform supplemental scanning operations as well as facilitate network discovery operations.

Method 800 may perform operation 802 during which a triggering event may be identified. In various embodiments, the triggering event may identify a network connection request. Accordingly, the triggering event may be a network scanning or connection request generated by one or more wireless device included in a wireless system. In one example, an application executing on a mobile device may determine scanning for an external network should be performed. The mobile device may send a message to an access point, such as a head unit, and the head unit may identify the message as a triggering event that includes a network connection request. In some embodiments, the triggering event may be a passage of a designated period of time. Accordingly, such performing of scanning operations may be implemented periodically, and after a designated period of time. In various embodiments, a triggering event may be a system event, such as a resource conflict or execution of a parallel operation. For example, a parallel operation may preclude a device, such as the head unit, from resources used for discovery operations, such as a particular radio. In such a situation, the resource conflict may be detected by the head unit as a triggering event, and supplemental scanning may be initiated.

Method 800 may perform operation 804 during which one or more polling operations may be performed. In various embodiments, one or more available wireless devices may be identified based on the one or more polling operations. Accordingly, the access point may poll all wireless devices included in its respective wireless system and currently connected to the access point via a network connection which may be a local area network. The polling operations may be used to identify which wireless devices have what resources available. Accordingly, the access point may send the wireless devices a query, and each wireless device may generate and send a reply that identifies whether or not the wireless device includes a radio capable of performing scanning operations, and whether or not the radio is idle, or is being used.

Method 800 may perform operation 806 during which a request may be sent to a wireless device. As similarly discussed above, the request may include scanning parameters, such as a particular frequency band on which scanning should be implemented. Thus, the scanning parameters may identify any network device sending advertisement frames on a particular frequency band, such as 5 GHz or 2.4 GHz. The scanning parameters may also identify additional features of network devices, such as whether or not they are executing a particular application or satisfy any other suitable criteria. The scanning parameters may be inferred from the triggering event by the access point. For example, the scanning parameters may have been generated by an application of a mobile device, and included in a message sent to the access point. The access point may determine the scanning parameters by parsing them from the message. Accordingly, the scanning parameters may be specific to a requested scan. In some embodiments, scanning parameters may be used to generate different requests for different devices. For example, a first device may be instructed to scan on a 2.4 GHz connection, and a second device may be instructed to scan on a 5 GHz connection.

In various embodiments, based on the responses received via the polling operations, the access point may identify one or more wireless devices to implement supplemental scanning operations. More specifically, the access point may filter, based on availability, the wireless devices from which replies were received. Thus, the access point may identify wireless devices that responded to the polling query, and are available and have an idle radio capable of performing scanning operations. The access point may then select one or more of the available wireless devices to implement scanning operations in accordance with the scanning parameters. In one example, the access point may select all available wireless devices to implement scanning operations. In another example, the access point may select an available wireless device that was first to provide a reply to the polling operations. Accordingly, features of the wireless devices as well as metadata of the responses to the polling operations may be used to identify at least one available wireless device to perform scanning operations, and during operation 806, a request may be sent to the identified and selected available wireless devices.

Method 800 may perform operation 808 during which one or more scanning operations may be performed by at least one of the available wireless devices. Accordingly, the selected at least one available wireless device may perform scanning operations such as the probe transmit and response operations described above. Moreover, during operation 808, the at least one available wireless device may receive a reply from a discoverable network device. Such a reply may be received via an advertisement frame sent by the discoverable network device. In this way, idle radios distributed throughout the local network of the access point are specifically instructed to perform scanning operations for discovery of network devices in other networks.

Method 800 may perform operation 810 during which a reply may be received from the at least one available wireless device. The reply may include a result of one or more scanning operations. Accordingly, the available wireless device may perform the scanning operations as instructed by the access point, and in accordance with the specified scanning parameters. The wireless device may have detected a discoverable network device via reception of one or more advertisement frames sent by the discoverable network device. Various network device identifiers and network connection information may be received via the advertisement frame. Accordingly, the reply may include various wireless network parameters and wireless device parameters such as a service set identifier (SSID), a channel identifier, received signal strength indicator (RSSI) metrics, and any other suitable Wi-Fi channel descriptor or network device type descriptor. The available wireless device may generate a message that includes a result of the scanning operations and, the message may be sent back to the access point. Accordingly, the message may be received as a reply that includes the result of the one or more scanning operations.

In various embodiments, the request sent to the available wireless device and the reply received from the wireless device may be sent over a separate network connection than the others used to support other functionalities, such as a high-QoS connection. For example, an access point may be in communication with a first wireless device and providing the first wireless device with a high-QoS network connection that uses both the 5 GHz Wi-Fi connection and the Bluetooth connection. The access point may also be in communication with a second wireless device via a 2.4 GHz Wi-Fi connection. The access point may use a Bluetooth Low Energy (BLE) connection to send requests to the wireless devices and receive replies from the wireless devices. In this way, the access point may send a request to the second wireless device via a BLE connection, and the second wireless device may perform scanning using its idle 5 GHZ Wi-Fi radio.

Method 800 may perform operation 812 during which a scanning modality may be selected based, at least in part, on the reply. Accordingly, the access point may identify and select a scanning modality and one or more network connection operations based on the results included in the reply. For example, if the reply includes an identified discoverable network device, the access point may have previously disabled persistent scanning operations, and may instead proceed to configure and select network connection operations based on the information included in the reply, and as similarly discussed above with reference to FIG. 3. Moreover, the network connection operations may be configured based on the contents of the message received at operation 810, and may be specific to the identified discoverable network device.

Method 800 may perform operation 814 during which a network connection operation may be performed based, at least in part, on the result included in the reply. Accordingly, during operation 814, the network connection operations may be performed, and a network connection may be established between the access point and the identified discoverable network device. In this way, additional wireless devices in the system may be utilized for scanning operations and offloaded from the access point, and the access point may instead be used for network connection operations once a discoverable network device is identified.

Figure 9:
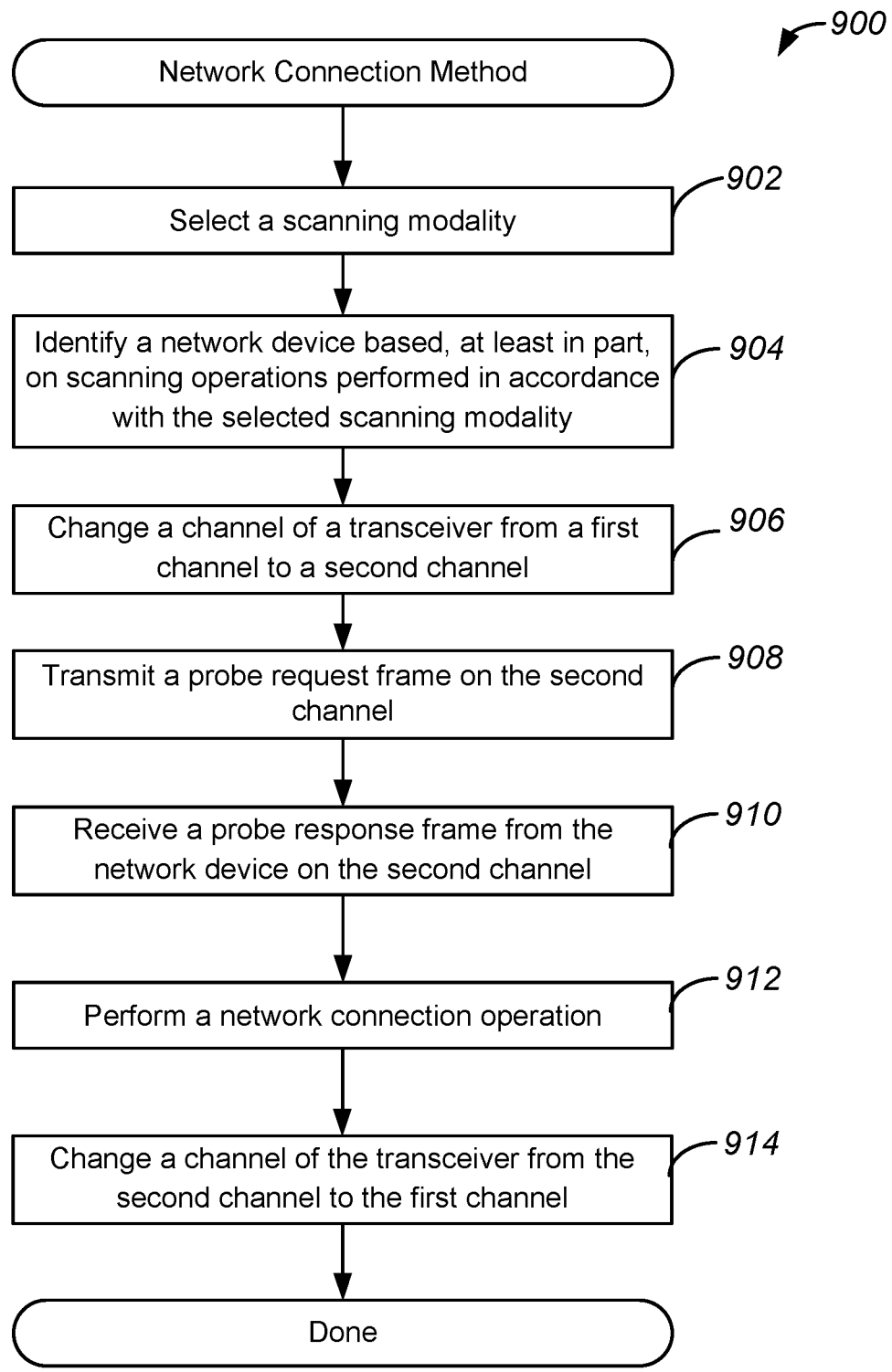
FIG. 9 illustrates an example of yet another method for supplemental scanning in a wireless network, implemented in accordance with some embodiments.

FIG. 9 illustrates an example of yet another method for supplemental scanning in a wireless network, implemented in accordance with some embodiments. As similarly discussed above, wireless devices disclosed herein may utilize idle radios and transceivers of wireless devices in the network to perform supplemental scanning operations used for network discovery. As will be discussed in greater detail below, a method, such as method 900, may be performed to utilize results of supplemental scanning operations to establish a network connection with an identified network device. In this way, the results of the supplemental scanning operations may be used to implement targeted, non-persistent network connection operations.

Method 900 may perform operation 902 during which a scanning modality may be selected. As discussed above, an access point may be capable of performing a persistent scanning modality in which the access point persistently scans for discoverable network devices between each set of wireless projection packets. Moreover, as also discussed above, the access point may also be capable of performing a non-persistent and distributed scanning modality in which the access point issues supplemental scanning commands to available wireless devices, and the available wireless devices perform scanning operations.

Accordingly, during operation 902, a particular scanning modality may be selected based on one or more configuration parameters. Such configuration parameters may be a default setting, or may have been set by an entity, such as a user. Moreover, configuration parameters may be generated based on one or more operational conditions of an access point, such as whether or not other wireless devices are connected to the access point on a local network. In this example, if such other wireless devices are present the non-persistent distributed scanning modality may be selected.

Method 900 may perform operation 904 during which a network device may be identified. If the non-persistent distributed scanning modality is selected, the network device may be a discoverable network device that was identified during scanning operations, as discussed above with reference to FIG. 8. Accordingly, during operation 904, the network device may be identified by an access point, and may be identified based on a result of scanning operations performed by one or more available wireless devices in a local network of the access point.

Method 900 may perform operation 906 during which a channel of a transceiver may be changed from a first channel to a second channel. Accordingly, the access point may switch a channel of a transceiver from a first channel to a second channel on which the discoverable network device is active. As discussed above with reference to at least FIG. 3, the change of the channel may be interleaved with wireless projection packets of a high-QoS connection.

Method 900 may perform operation 908 during which a probe request frame may be transmitted on the second channel. Accordingly, the access point may transmit a probe request frame on the second channel to confirm the presence of and availability of the identified discoverable network device. In various embodiments, the probe request frame also includes a request to join the external network of the discoverable network device.

Method 900 may perform operation 910 during which a probe response frame may be received from the network device on the second channel. Accordingly, the discoverable network device may confirm that the access point is compatible with the external network, and may generate a probe response frame that is sent back to and received by the access point. Accordingly, the probe response frame may grant the access point access to the external network.

Method 900 may perform operation 912 during which a network connection operation may be performed. Accordingly, the access point may establish a network connection with the discoverable network device on the second channel, and such a network connection may also be made available to other wireless devices connected to the access point. In this way, the newly established network connection may also be used by additional wireless devices in the wireless system.

Method 900 may perform operation 914 during which a channel of the transceiver may be changed from the second channel to the first channel. Accordingly, once the network connection operation has been completed, the access point may change back to the first channel to continue to receive wireless projection packets and support the high-QoS connection. In this way, the access point may establish a connection with the discoverable network device using one iteration of probe request/response frames, and does not need to persistently scan using multiple iterations of probe request/response frames.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
    sending a request to a wireless device, the request comprising a plurality of scanning parameters, the plurality of scanning parameters identifying a plurality of requested wireless network parameters;
    receiving a reply from the wireless device, the reply comprising a result of one or more scanning operations performed based on the plurality of scanning parameters;
    selecting, using one or more processors, one or more network connection operations based, at least in part, on the result of the one or more scanning operations, the one or more network connection operations identifying a timing relative to a plurality of wireless projection packets; and
    performing, using the one or more processors, the one or more network connection operations based, at least in part, on the identified timing.

2. The method of claim 1 further comprising:
    disabling a first scanning modality; and
    enabling a second scanning modality, the one or more scanning operations being performed in accordance with the second scanning modality.

3. The method of claim 2, wherein the first scanning modality is persistent, and wherein the second scanning modality is not persistent.

4. The method of claim 1, wherein the plurality of requested wireless network parameters comprises an identification of a network device type and a wireless channel.

5. The method of claim 4, wherein the reply comprises one or more data values identifying an available network device matching the requested wireless network parameters.

6. The method of claim 5, wherein the wireless device is a mobile communications device.

7. The method of claim 6, wherein the wireless device is a wireless headset.

8. The method of claim 1, wherein the one or more processors are included in an access point implemented in an automobile.

9. The method of claim 8, wherein the access point is included in an infotainment system of the automobile.

10. A device comprising:
    a memory configured to store a plurality of scanning parameters;
    processing logic configured to:
        send a request to a wireless device, the request comprising a plurality of scanning parameters, the plurality of scanning parameters identifying a plurality of requested wireless network parameters;
        receive a reply from the wireless device, the reply comprising a result of one or more scanning operations performed based on the plurality of scanning parameters;
        select one or more network connection operations based, at least in part, on the result of the one or more scanning operations, the one or more network connection operations identifying a timing relative to a plurality of wireless projection packets; and
        perform the one or more network connection operations based, at least in part, on the identified timing.

11. The device of claim 10, wherein the processing logic is further configured to:
    disable a first scanning modality; and
    enable a second scanning modality, the one or more scanning operations being performed in accordance with the second scanning modality.

12. The device of claim 11, wherein the first scanning modality is persistent, and wherein the second scanning modality is not persistent.

13. The device of claim 10, wherein the plurality of requested wireless network parameters comprises an identification of a network device type and a wireless channel.

14. The device of claim 13, wherein the reply comprises one or more data values identifying an available network device matching the requested wireless network parameters.

15. The device of claim 10, wherein the processing logic is included in an access point implemented in an automobile.

16. A system comprising:
an antenna configured to transmit and receive wireless signals;
a transceiver coupled to the antenna;
a memory configured to store a plurality of scanning parameters; and
processing logic configured to:
send a request to a wireless device, the request comprising a plurality of scanning parameters, the plurality of scanning parameters identifying a plurality of requested wireless network parameters;
receive a reply from the wireless device, the reply comprising a result of one or more scanning operations performed based on the plurality of scanning parameters;
select one or more network connection operations based, at least in part, on the result of the one or more scanning operations, the one or more network connection operations identifying a timing relative to a plurality of wireless projection packets; and
perform the one or more network connection operations based, at least in part, on the identified timing.

17. The system of claim 16, wherein the processing logic is further configured to:
disable a first scanning modality; and
enable a second scanning modality, the one or more scanning operations being performed in accordance with the second scanning modality.

18. The system of claim 17, wherein the first scanning modality is persistent, and wherein the second scanning modality is not persistent.

19. The system of claim 16, wherein the plurality of requested wireless network parameters comprises an identification of a network device type and a wireless channel.

20. The system of claim 19, wherein the reply comprises one or more data values identifying an available network device matching the requested wireless network parameters.

* * * * *